United States Patent
LeBeau et al.

(10) Patent No.: US 8,930,195 B1
(45) Date of Patent: Jan. 6, 2015

(54) USER INTERFACE NAVIGATION

(75) Inventors: Michael J. LeBeau, New York, NY (US); Max Benjamin Braun, San Francisco, CA (US)

(73) Assignee: Google Inc., Mountain View ( * ) Notice: Subject to any disclaimer, the term of this patent is extended or adjusted under 35 U.S.C. 154(b) by 273 days.

(21) Appl. No.: 13/473,942

(22) Filed: May 17, 2012

(51) Int. Cl.
*G02B 27/01* (2006.01)
*G10L 21/00* (2013.01)

(52) U.S. Cl.
USPC .......................................................... 704/275

(58) Field of Classification Search
USPC .......................................................... 704/275
See application file for complete search history.

(56) References Cited

U.S. PATENT DOCUMENTS

| | | | |
|---|---|---|---|
| 4,335,276 A | 6/1982 | Bull et al. | |
| 6,894,427 B2 | 5/2005 | Alfini | |
| 8,553,910 B1 * | 10/2013 | Dong et al. | 381/151 |
| 2006/0000472 A1 | 1/2006 | Fenton | |
| 2010/0235170 A1 | 9/2010 | Rothenberg | |

* cited by examiner

*Primary Examiner* — Susan McFadden
(74) *Attorney, Agent, or Firm* — McDonnell Boehnen Hulbert & Berghoff LLP

(57) ABSTRACT

Methods and systems described herein relate to using nasal vocalizations to control a head-mountable device. An example method could include causing at least one sensor of a head-mountable device to detect a vibration. The head-mountable device could include a near-eye display. The method could further include determining the vibration corresponds to a first nasal vocalization from a plurality of nasal vocalizations. The method could also include controlling the head-mountable device based on the first nasal vocalization. The plurality of nasal vocalizations could include at least an affirmative vocalization and a negative vocalization.

29 Claims, 7 Drawing Sheets

USER INTERFACE NAVIGATION

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called a head-mountable device or a "head-mounted display". A head-mountable device places a graphic display or displays close to one or both eyes of a wearer. To generate the images on a display, a computer processing system may be used. Such displays may occupy a wearer's entire field of view, or only occupy part of wearer's field of view. Further, head-mountable devices may be as small as a pair of glasses or as large as a helmet.

SUMMARY

In a first aspect, a method is provided. The method includes causing at least one sensor of a head-mountable device to detect a vibration. The head-mountable device includes a near-eye display. The method further includes determining that the vibration corresponds to a first nasal vocalization from a plurality of nasal vocalizations. The method also includes controlling the head-mountable device based on the first nasal vocalization.

In a second aspect, a head-mountable device is provided. The head-mountable device includes a near-eye display, at least one sensor, a speech-recognition system, and a user-interface. The at least one sensor is configured to detect a vibration. The speech-recognition system is configured to determine that the vibration corresponds to a first nasal vocalization from a plurality of nasal vocalizations. The user interface is configured to control the head-mountable device based on the first nasal vocalization.

In a third aspect, a non-transitory computer readable medium having stored instructions is provided. The instructions are executable by a computing device to cause the computing device to perform functions. The functions include causing at least one sensor of a head-mountable device to detect a vibration. The head-mountable device includes a near-eye display. The functions further include determining that the vibration corresponds to a first nasal vocalization from a plurality of nasal vocalizations. The functions also include providing a control instruction to the head-mountable device based on the first nasal vocalization.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 1B illustrates an alternate view of the head-mountable device illustrated in

FIG. 1A.

DETAILED DESCRIPTION

Figure 1A:
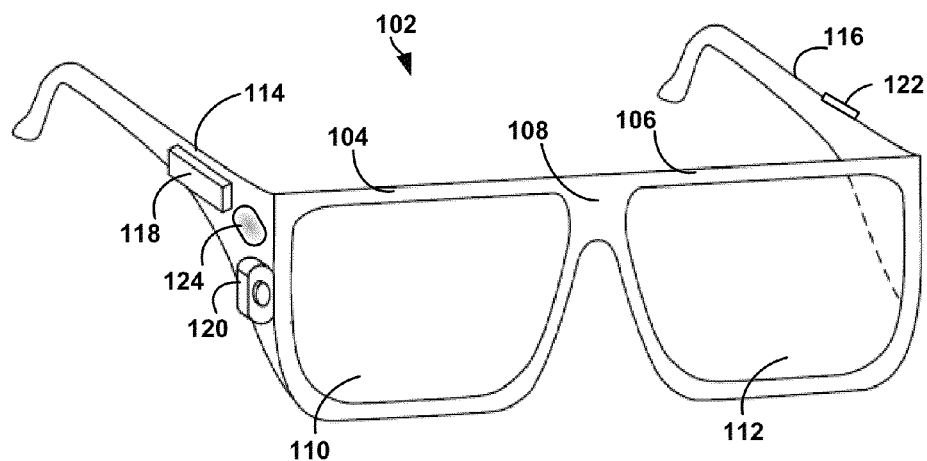
FIG. 1A illustrates a head-mountable device, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

When providing commands such as 'yes' and 'no', humans may use nasal vocalizations such as "um-hmm" (for yes), and "mm-mm" (for no). In an effort to create a more intuitive user experience, a computing device can be configured to recognize, and be controlled by, such nasal vocalizations. The computing device could be, for example, a wearable computer that could be worn on a user's head. The computing device could sense nasal vocalizations from the user or from elsewhere. If the computing device senses a predetermined nasal vocalization, the computing device could carry out various actions.

Example embodiments disclosed herein relate to causing at least one sensor of a head-mountable device to detect a vibration, determining that the vibration corresponds to a first nasal vocalization from a plurality of nasal vocalizations, and controlling the head-mountable device based on the first nasal vocalization.

Some methods disclosed herein could be carried out in part or in full by a head-mountable device (HMD). The head-mountable device could be a head-mountable display. However, the HMD could represent another type of wearable computing device. The HMD could include a near-eye display configured to display images to a user of the head-mountable device. The HMD may include at least one sensor operable to detect a vibration. The at least one sensor could include an accelerometer. The vibration could originate from a user of the HMD. For example, the user could create a sound generally associated with a nasal vocalization. Such nasal vocalizations could include: mm-hmm and mm-mm, among other examples.

The HMD may determine that the vibration corresponds to a first nasal vocalization from a plurality of nasal vocalizations. The determination could be done using a speech-recognition system. The first nasal vocalization could be determined based on the speech-recognition system comparing the vibration to a set of predetermined nasal vocalizations. The set of predetermined nasal vocalizations could include nasal vocalizations that could be used as command instructions for a user interface of the HMD.

Upon determining that the vibration corresponds to a first nasal vocalization, the HMD could control the user interface based on the first nasal vocalization. For instance, the user interface could carry out or dismiss various actions using the HMD based on the first nasal vocalization.

Other methods disclosed herein could be carried out in part or in full by a server. In an example embodiment, the server could determine that the vibration corresponds to a first nasal vocalization from a plurality of nasal vocalizations. For example, the HMD may transmit the vibration or a representation of the vibration to the server. The server may compare the vibration to a set of predetermined nasal vocalizations to determine if the vibration corresponds to one of the predetermined nasal vocalizations. The plurality of nasal vocalizations could be stored at the server. If the vibration is determined to correspond to a predetermined nasal vocalization (the first nasal vocalization), the server could control a user interface of the HMD based on the first nasal vocalization. Other aspects of the device could be controlled by the server. Other interactions between a device and a server are possible within the context of the disclosure.

A head-mountable device (HMD) is also described in the present disclosure. The HMD could include a near-eye display, at least one sensor, a speech-recognition system, and a user interface. The at least one sensor could be configured to detect a vibration. The speech-recognition system could be configured to determine that the vibration corresponds to a first nasal vocalization from a set of nasal vocalizations. The user interface could be configured to control the head-mountable device based on the first nasal vocalization.

The vibration could originate from a user of the HMD. The vibration could be a nasal vocalization such as the nasal forms of affirmative vocalization (mm-hmm) and negative vocalization (mm-mm). Other types of nasal vocalizations are possible.

The set of nasal vocalizations could be stored by the HMD or the set of nasal vocalizations could be fully or partially stored elsewhere.

It will be understood that an example system could include more or fewer elements than those disclosed herein. Further the elements of the example system could be configured and/or be operable to perform more or fewer functions within the context of the present disclosure.

In some embodiments, each of the elements of the system could be incorporated into the head-mounted device. In other embodiments, some or all of the elements of the system may be located apart from other elements of the system. Thus, the system could operate in a distributed manner.

Also disclosed herein are non-transitory computer readable media with stored instructions. The instructions could be executable by a computing device to cause the computing device to perform functions similar to those described in the aforementioned methods.

Those skilled in the art will understand that there are many different specific methods and systems that could be used in causing at least one sensor of a head-mountable device to detect a vibration, determining that the vibration corresponds to a first nasal vocalization from a plurality of nasal vocalizations, and controlling the head-mountable device based on the first nasal vocalization. Each of these specific methods and systems are contemplated herein, and several example embodiments are described below.

2. Example Systems

Systems and devices in which example embodiments may be implemented will now be described in greater detail. In general, an example system may be implemented in or may take the form of a wearable computer. However, an example system may also be implemented in or take the form of other devices, such as a mobile phone, among others. Further, an example system may take the form of non-transitory computer readable medium, which has program instructions stored thereon that are executable by at a processor to provide the functionality described herein. An example, system may also take the form of a device such as a wearable computer or mobile phone, or a subsystem of such a device, which includes such a non-transitory computer readable medium having such program instructions stored thereon.

FIG. 1A illustrates a head-mountable device (HMD) 102 (which may also be referred to as a head-mounted display). In some implementations, HMD 102 could function as a wearable computing device. It should be understood, however, that example systems and devices may take the form of or be implemented within or in association with other types of devices, without departing from the scope of the invention. Further, unless specifically noted, it will be understood that the systems, devices, and methods disclosed herein are not functionally limited by whether or not the head-mountable device 102 is being worn. As illustrated in FIG. 1A, the head-mountable device 102 comprises frame elements including lens-frames 104, 106 and a center frame support 108, lens elements 110, 112, and extending side-arms 114, 116. The center frame support 108 and the extending side-arms 114, 116 are configured to secure the head-mountable device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mountable device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the head-mountable device 102 to the user. The extending side-arms 114, 116 may further secure the head-mountable device 102 to the user by extending around a rear portion of the user's head. Additionally or alternatively, for example, the HMD 102 may connect to or be affixed within a head-mountable helmet structure. Other possibilities exist as well.

The HMD 102 may also include an on-board computing system 118, a video camera 120, a sensor 122, and a finger-operable touch pad 124. The on-board computing system 118 is shown to be positioned on the extending side-arm 114 of the head-mountable device 102; however, the on-board computing system 118 may be provided on other parts of the head-mountable device 102 or may be positioned remote from the head-mountable device 102 (e.g., the on-board computing system 118 could be wire- or wirelessly-connected to the head-mountable device 102). The on-board computing system 118 may include a processor and memory, for example. The on-board computing system 118 may be configured to receive and analyze data from the video camera 120 and the finger-operable touch pad 124 (and possibly from other sensory devices, user interfaces, or both) and generate images for output by the lens elements 110 and 112.

The video camera 120 is shown positioned on the extending side-arm 114 of the head-mountable device 102; however, the video camera 120 may be provided on other parts of the head-mountable device 102. The video camera 120 may be configured to capture images at various resolutions or at different frame rates. Many video cameras with a small form-factor, such as those used in cell phones or webcams, for example, may be incorporated into an example of the HMD 102.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mountable device 102; however, the sensor 122 may be positioned on other parts of the head-mountable device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mountable device 102. However, the finger-operable touch pad 124 may be positioned on other parts of the head-mountable device 102. Also, more than one finger-operable touch pad may be present on the head-mountable device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 1B:
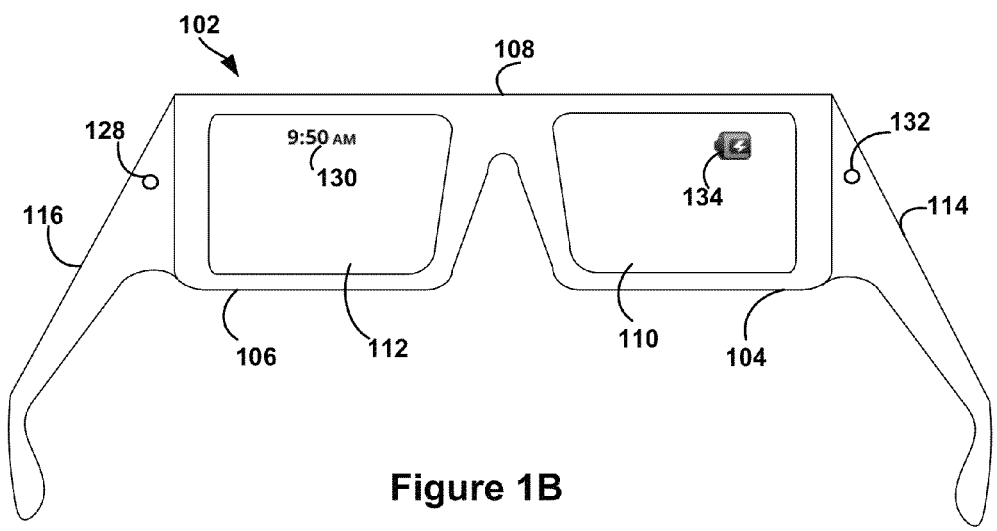

FIG. 1B illustrates an alternate view of the head-mountable device illustrated in FIG. 1A. As shown in FIG. 1B, the lens elements 110, 112 may act as display elements. The head-mountable device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
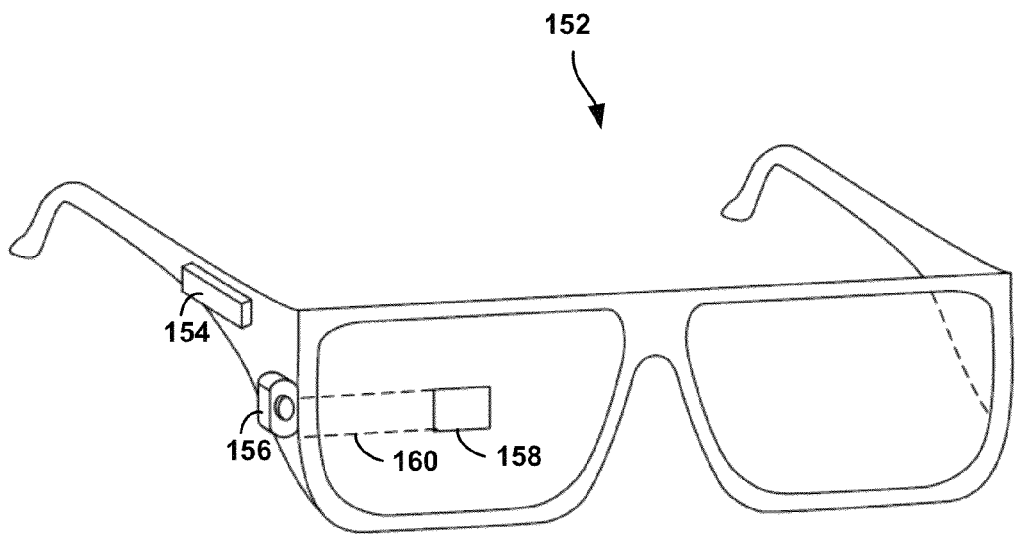
FIG. 1C illustrates another head-mountable device, according to an example embodiment.

FIG. 1C illustrates another head-mountable device according to an example embodiment, which takes the form of an HMD 152. The HMD 152 may include frame elements and side-arms such as those described with respect to FIGS. 1A and 1B. The HMD 152 may additionally include an on-board computing system 154 and a video camera 206, such as those described with respect to FIGS. 1A and 1B. The video camera 206 is shown mounted on a frame of the HMD 152. However, the video camera 206 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions. The display 158 is controllable via the computing system 154 that is coupled to the display 158 via an optical waveguide 160.

Figure 1D:
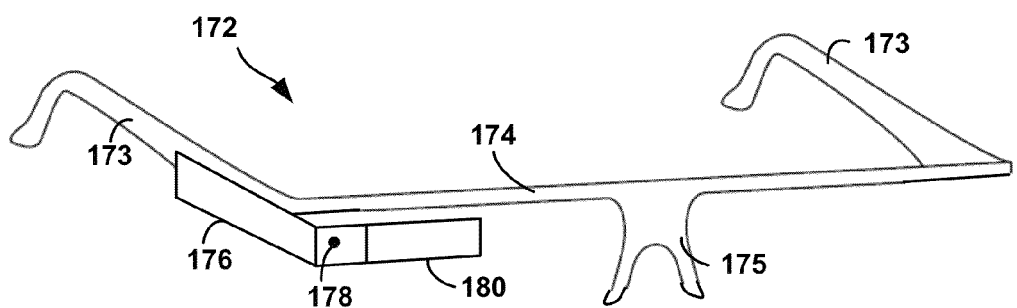
FIG. 1D illustrates another head-mountable device, according to an example embodiment.

FIG. 1D illustrates another head-mountable device according to an example embodiment, which takes the form of an HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include an on-board computing system 176 and a video camera 178, such as those described with respect to FIGS. 1A and 1B.

The HMD 172 may include a single lens element 180 that may be coupled to one of the side-arms 173 or the center frame support 174. The lens element 180 may include a display such as the display described with reference to FIGS. 1A and 1B, and may be configured to overlay computer-generated graphics upon the user's view of the physical world. In one example, the single lens element 180 may be coupled to the inner side (i.e., the side exposed to a portion of a user's head when worn by the user) of the extending side-arm 173. The single lens element 180 may be positioned in front of or proximate to a user's eye when the HMD 172 is worn by a user. For example, the single lens element 180 may be positioned below the center frame support 174, as shown in FIG. 1D.

Figure 2:
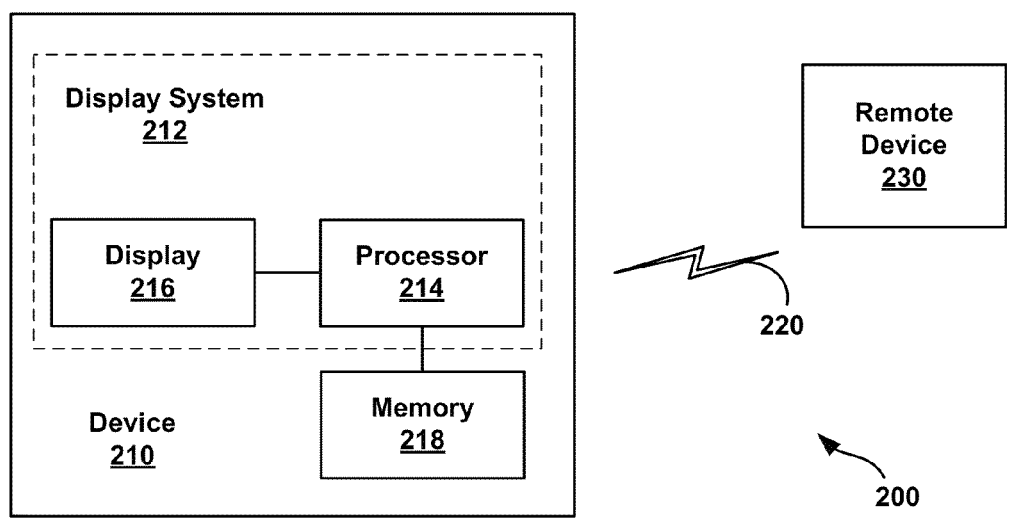
FIG. 2 illustrates a schematic drawing of a computing device, according to an example embodiment.

FIG. 2 illustrates a schematic drawing of a computing device according to an example embodiment. In system 200, a device 210 communicates using a communication link 220 (e.g., a wired or wireless connection) to a remote device 230. The device 210 may be any type of device that can receive data and display information corresponding to or associated with the data. For example, the device 210 may be a head-mountable display system, such as the head-mountable devices 102, 152, or 172 described with reference to FIGS. 1A-1D.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a microprocessor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

Figure 3:
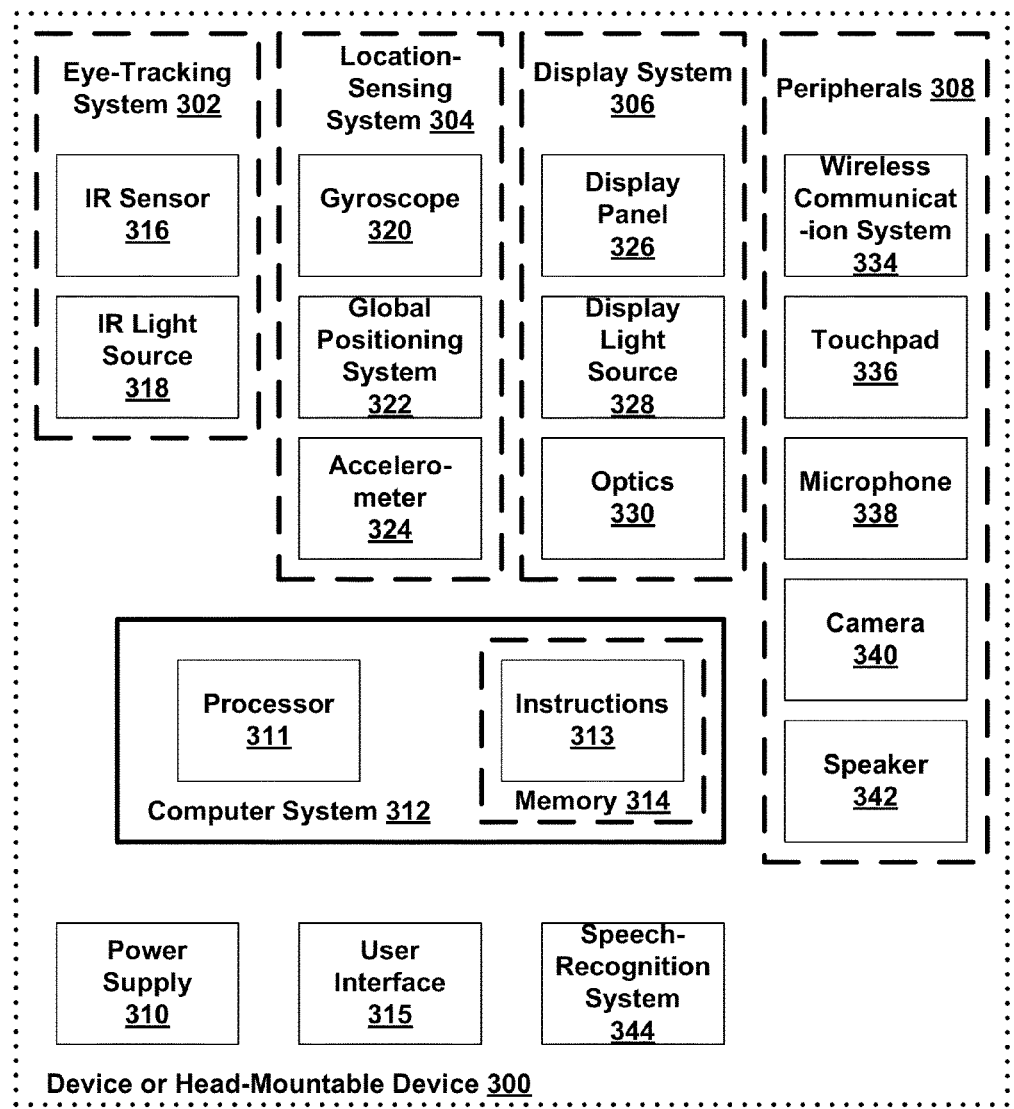
FIG. 3 illustrates a simplified block drawing of a device or head-mountable device, according to an example embodiment.

FIG. 3 is a simplified block diagram of a device or head-mountable device (HMD) 300 that may include several different components and subsystems. HMD 300 could correspond to any of the devices shown and described in reference to FIGS. 1A-1D and FIG. 2. As shown, the HMD 300 includes an eye-tracking system 302, a location-sensing system 304, an display system 306, peripherals 308, a power supply 310, a computer system 312, a memory 314, and a user interface 315. The eye-tracking system 302 may include hardware such as an infrared sensor 316 and at least one infrared light source 318. The location-sensing system 304 may include a gyroscope 320, a global positioning system (GPS) 322, and an accelerometer 324. The display system 306 may include, in one embodiment, a display panel 326, a display light source 328, and optics 330. The peripherals 308 may include a wireless communication system 334, a touchpad 336, a microphone 338, a camera 340, and a speaker 342. The system may additionally include a speech-recognition system 344.

In an example embodiment, HMD 300 includes a see-through display. Thus, the wearer of HMD 300 may observe a portion of the real-world environment, i.e., in a particular field of view provided by the display system 306. In the example embodiment, HMD 300 is operable to display images that are superimposed on the field of view, for example, to provide an "augmented reality" experience. Some of the images displayed by HMD 300 may be superimposed over particular objects in the field of view. HMD 300 may also display images that appear to hover within the field of view instead of being associated with particular objects in the field of view.

HMD 300 could be configured as, for example, eyeglasses, goggles, a helmet, a hat, a visor, a headband, or in some other form that can be supported on or from the wearer's head. Further, HMD 300 may be configured to display images to both of the wearer's eyes, for example, using two see-through displays. Alternatively, HMD 300 may include only a single see-through display and may display images to only one of the wearer's eyes, either the left eye or the right eye.

The HMD 300 may also represent an opaque display configured to display images to one or both of the wearer's eyes without a view of the real-world environment. For instance, an opaque display or displays could provide images to both of the wearer's eyes such that the wearer could experience a virtual reality version of the real world. Alternatively, the HMD wearer may experience an abstract virtual reality environment that could be substantially or completely detached from the real world. Further, the HMD 300 could provide an opaque display for a first eye of the wearer as well as provide a view of the real-world environment for a second eye of the wearer.

A power supply 310 may provide power to various HMD components and could represent, for example, a rechargeable lithium-ion battery. Various other power supply materials and types known in the art are possible.

The functioning of the HMD 300 may be controlled by a computer system 312 (which could include a processor 311) that executes instructions 313 stored in a non-transitory computer readable medium, such as the memory 314. Thus, the computer system 312 in combination with instructions 313 stored in the memory 314 may function to control some or all of the functions of HMD 300. As such, the computer system 312 may control the user interface 315 to adjust the images displayed by HMD 300. The computer system 312 may also control the wireless communication system 334 and various other components of the HMD 300. The computer system 312 may additionally represent a plurality of computing devices that may serve to control individual components or subsystems of the HMD 300 in a distributed fashion.

In addition to instructions that may be executed by the computer system 312, the memory 314 may store data that may include a set of calibrated wearer eye pupil positions and a collection of past eye pupil positions. Thus, the memory 314 may function as a database of information related to gaze axis and/or HMD wearer eye location. Such information may be used by HMD 300 to anticipate where the wearer will look and determine what images are to be displayed to the wearer. Within the context of the invention, eye pupil positions could also be recorded relating to a 'normal' or a 'calibrated' viewing position. Eye box or other image area adjustment could occur if the eye pupil is detected to be at a location other than these viewing positions.

In addition, information may be stored in the memory 314 regarding possible control instructions that may be enacted using eye movements. For instance, two consecutive wearer eye blinks may represent a control instruction to the user interface. Another possible embodiment may include a configuration such that specific eye movements may represent a control instruction. For example, an HMD wearer may provide a control instruction with a series of predetermined eye movements.

Control instructions could be based on dwell-based selection of a target object. For instance, if a wearer fixates visually upon a particular image or real-world object for longer than a predetermined time period, a control instruction may be generated to select the image or real-world object as a target object. Many other control instructions are possible.

The HMD 300 may include a user interface 315 for providing information to the wearer or receiving input from the wearer. The user interface 315 could be associated with, for example, the displayed images and/or one or more input devices in peripherals 308, such as touchpad 336 or microphone 338. The computer system 312 may control the functioning of the HMD 300 based on inputs received through the user interface 315. For example, the computer system 312 may utilize user input from the user interface 315 to control how the HMD 300 displays images within a field of view or to determine what images the HMD 300 displays.

An eye-tracking system 302 may be included in the HMD 300. In an example embodiment, an eye-tracking system 302 may deliver eye-tracking data to the computer system 312 regarding the eye position of a wearer of the HMD 300. The eye-tracking data could be used, for instance, to determine a direction in which the HMD user may be gazing. The direction of gaze could be alternatively called a gaze axis. Eye-tracking data related to the direction of gaze may be termed gaze data. Based on information from the eye-tracking system 302 such as the gaze axis, the computer system 312 could determine target objects among the displayed images or real-world environment. The computer system 312 may control the user interface 315 and the display panel 326 to adjust the target object and/or other displayed images in various ways. For instance, an HMD wearer could interact with a mobile-type menu-driven user interface using eye gaze movements.

The infrared (IR) sensor 316 may be utilized by the eye-tracking system 302, for example, to capture images of a viewing location associated with the HMD 300. Thus, the IR sensor 316 may image the eye of an HMD wearer that may be located at the viewing location. The images could be either video images or still images. The images obtained by the IR sensor 316 regarding the HMD wearer's eye may help determine where the wearer is looking within the HMD field of view, for instance by allowing the computer system 312 to ascertain the location of the HMD wearer's eye pupil. Analysis of the images obtained by the IR sensor 316 could be performed by the computer system 312 in conjunction with the memory 314 to determine, for example, a gaze axis.

The imaging of the viewing location could occur continuously or at discrete times depending upon, for instance, HMD wearer interactions with the user interface 315 and/or the state of the infrared light source 318 which may serve to illuminate the viewing location. The IR sensor 316 could be integrated into the display system 306 or mounted on the HMD 300. Alternatively, the IR sensor 316 could be positioned apart from the HMD 300 altogether. The IR sensor 316 could be configured to image primarily in the infrared. The IR sensor 316 could additionally represent a conventional visible light camera with sensing capabilities in the infrared wavelengths. Imaging in other wavelength ranges is possible.

The infrared light source 318 could represent one or more infrared light-emitting diodes (LEDs) or infrared laser diodes that may illuminate a viewing location. One or both eyes of a wearer of the HMD 300 may be illuminated by the infrared light source 318.

The eye-tracking system 302 could be configured to acquire images of glint reflections from the outer surface of the cornea, (e.g., the first Purkinje images and/or other characteristic glints). Alternatively, the eye-tracking system 302 could be configured to acquire images of reflections from the inner, posterior surface of the lens, (e.g., the fourth Purkinje images). In yet another embodiment, the eye-tracking system 302 could be configured to acquire images of the eye pupil with so-called bright and/or dark pupil images. Depending upon the embodiment, a combination of these glint and pupil imaging techniques may be used for eye tracking at a desired level of robustness. Other imaging and tracking methods are possible.

The location-sensing system 304 could be configured to provide an HMD position and an HMD orientation to the computer system 312.

The gyroscope 320 could be a microelectromechanical system (MEMS) gyroscope, a fiber optic gyroscope, or another type of gyroscope known in the art. The gyroscope 320 may be configured to provide orientation information to the computer system 312. The GPS unit 322 could be a receiver that obtains clock and other signals from GPS satellites and may be configured to provide real-time location information to the computer system 312. The location-sensing system 304 could further include an accelerometer 324 configured to provide motion input data to the computer system 312. The location-sensing system 304 could include other sensors, such as a proximity sensor and/or an inertial measurement unit (IMU).

At least one sensor of the HMD could be operable to sense vibrations. For example, the accelerometer 324 could be configured to sense vibrations, which may originate from a user of the head-mountable device. In particular, the user may form the vibrations by making nasal vocalizations. Although accelerometer 324 is illustrated as being part of the location-sensing system 304, the one or more sensors of the HMD operable to sense vibrations need not be part of the location-sensing system 304.

The display system 306 could include components configured to provide images at a viewing location. The viewing location may correspond to the location of one or both eyes of a wearer of an HMD 300. The components of the display system 306 could include a display panel 326, a display light source 328, and optics 330. These components may be optically and/or electrically-coupled to one another and may be configured to provide viewable images at a viewing location. As mentioned above, one or two optical systems 306 could be provided in an HMD apparatus. In other words, the HMD wearer could view images in one or both eyes, as provided by one or more optical systems 306. Also, as described above, the optical system(s) 306 could include an opaque display and/or a see-through display, which may allow a view of the real-world environment while providing superimposed images.

Various peripheral devices 308 may be included in the HMD 300 and may serve to provide information to and from a wearer of the HMD 300.

In one example, the HMD 300 may include a wireless communication system 334 for wirelessly communicating with one or more devices directly or via a communication network. For example, wireless communication system 334 could use 3G cellular communication, such as CDMA, EVDO, GSM/GPRS, or 4G cellular communication, such as WiMAX or LTE. Alternatively, wireless communication system 334 could communicate with a wireless local area network (WLAN), for example, using WiFi. In some embodiments, wireless communication system 334 could communicate directly with a device, for example, using an infrared link, Bluetooth, or ZigBee. The wireless communication system 334 could interact with devices that may include, for example, components of the HMD 300 and/or externally-located devices.

The camera 340 could be configured to capture still images and/or video images. In some embodiments, the field of view of camera 340 could be operable to substantially capture the same field of view as may be viewable to a user of the HMD 300. In other words, the HMD 300 may provide a view of the real-world environment when viewed from a viewing position. In such scenarios, the camera 340 could be configured to capture images of a substantially similar field of view. The camera 340 could represent any device configured to capture an image, such as an image-capture device. Other configurations of camera 340 are possible.

The speech-recognition system 344 could be separate from or integrated into computer system 312. The speech-recognition system 344 may be operable to determine a first nasal vocalization from a plurality of nasal vocalizations. Put another way, the speech-recognition system 344 could be configured to compare a vibration (which may be detected using a sensor, such as an accelerometer) to a set of predetermined nasal vocalizations. The predetermined nasal vocalizations could include sounds that may be recognized by the speech-recognition system 344 as corresponding with various control instructions to control the user interface of the HMD. The speech-recognition system 344 could use any number of speech-recognition algorithms to determine the first nasal vocalization from the plurality of nasal vocalization. For instance, the speech-recognition algorithms could include a hidden Markov model or a machine-learning process. Other speech-recognition algorithms are possible.

Although FIG. 3 shows various components of the HMD 300 as being integrated into HMD 300, one or more of these components could be physically separate from HMD 300. For example, the camera 340 could be mounted on the wearer separate from HMD 300. Thus, the HMD 300 could be part of a wearable computing device in the form of separate devices that can be worn on or carried by the wearer. The separate components that make up the wearable computing device could be communicatively coupled together in either a wired or wireless fashion.

3. Example Implementations

Several example implementations will now be described herein. It will be understood that there are many ways to implement the devices, systems, and methods disclosed herein. Accordingly, the following examples are not intended to limit the scope of the present disclosure.

Figure 4:
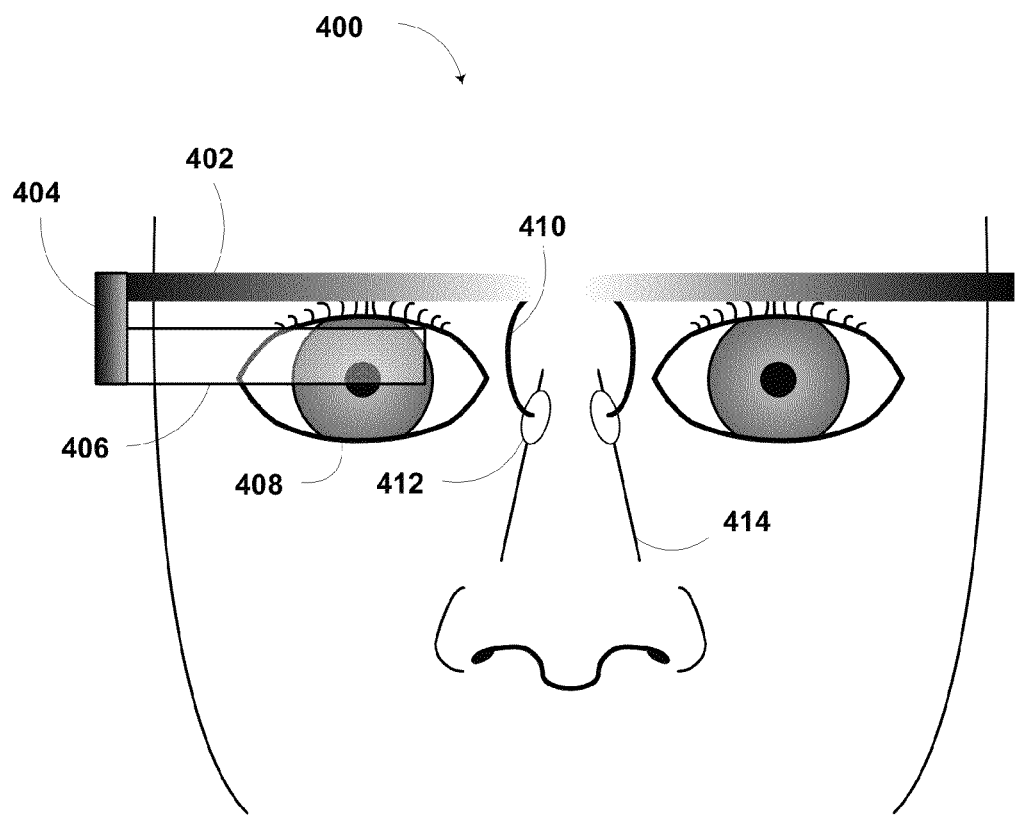
FIG. 4 illustrates an operating scenario of a head-mountable device, according to an example embodiment.

FIG. 4 illustrates an operating scenario 400 in which a user may be wearing a head-mountable device 402. The head-mountable device 402 could be similar or identical to the head-mountable device 300 described in reference to FIG. 3, or might take on a substantially different form.

The head-mountable device 402 may include a near-eye display 406, and a computer system 404. The near-eye display 406 could be configured to provide images to a right eye 408 of the user. The head-mountable device 402 could include nose pads 412 and supports 410 operable to physical support the head-mountable device 402 from the nose 414 of the user.

The computer system 404 could include a user interface operable to control at least some of the functions of the head-mountable device 402.

One or more sensors (not pictured) could be located in the supports 410, nose pads 412, or elsewhere in the head-mounted device 402. The one or more sensors could be operable to sense vibrations. The one or more sensors could be accelerometers or a different type of sensor. In some embodiments, the one or more sensors could include at least one microphone.

As detailed above, the near-eye display 406 could display graphics. In an example embodiment, the near-eye display 406 could optionally display a representation of an action. For example, the near-eye display 406 could include images relating to an event reminder, an icon, a location, etc. Any of the images displayed in the near-eye display 406 could be associated with the action. The images and the actions represented by the images could be controlled by the user of the head-mountable device. Put another way, the near-eye display 406 could display a graphical-user-interface (GUI) element that corresponds to an action (e.g., executing a certain computer program). The user can interact with the GUI element via the nasal vocalization, for instance to initiate (or dismiss) the corresponding action.

The user of the head-mountable device could form a vibration (e.g., a sound using mouth, lips, and/or vocal cords) generally associated with a nasal vocalization. In particular, the user may form a resonance in the nasal cavity while lowering his or her velum. In doing so, some air may escape through the user's nose. The resulting sound, which may or may not be audible to nearby individuals, could be similar to a humming sound (e.g., hmmm). Other sounds could include nasal stops such as [m], [n], and [ŋ].

Nasal vocalizations could be defined by other characteristics as well. For instance, nasal vocalizations could include a specific frequency or set of frequencies, or could include specific amplitude and/or waveform patterns.

Sounds could be combined to form affirmative vocalizations (e.g., Mm-hmm, Uh-huh, and Um-hum) or negative vocalizations (e.g., Mm-mm, Uh-uh, Huh-uh, or Hum-um). The negative vocalizations in particular may include glottal stops, which may include a short period of silence in between discrete sounds. In some embodiments, affirmative and negative vocalizations could be disambiguated by the presence (or lack) of glottal stops. The sounds that could be associated with affirmative and negative vocalizations may vary based on, for example, the user's language, culture, or any other reason.

The vibration created by the user of the head-mountable device 402 could be sensed using the one or more sensors. Based on the detected vibration, a first nasal vocalization could be determined. The determination could be done, for example, by comparing the detected vibration to a plurality of nasal vocalizations. The plurality of nasal vocalizations could include a set of vibrations or sounds that could be used to control the head-mountable device. Thus, a first nasal vocalization could be determined upon a substantial match between the vibration and a specific nasal vocalization from the plurality of nasal vocalizations. The substantial match could be determined by, for example, a speech-recognition system. Other ways to determine a first nasal vocalization are possible.

Upon determining the first nasal vocalization, a control instruction could be provided to the head-mountable device 402 based on the first nasal vocalization. Such control instructions could be configured to control the head-mountable device 402 to carry out an action or dismiss an action. For example, if the first nasal vocalization is determined to be an affirmative vocalization, the control instruction could be configured to control the head-mountable device 402 to carry out an action (e.g., create an event reminder, take a picture with a camera, commence audio recording, show graphical directions to a location, etc.). A representation of the action may or may not be provided by the near-eye display 406. In another embodiment, if the first nasal vocalization is determined to be a negative vocalization, the control instruction could be configured to control the head-mountable device 402 to dismiss an action.

Other nasal vocalizations could be determined from the plurality of nasal vocalizations in an effort to control the head-mountable device 402. In one embodiment, a nasal vocalization could be determined as a preamble to a voice-activated command. For instance, a user could make a nasal vocalization before speaking a command. In this way, the speech-recognition algorithms could more correctly disambiguate user commands from other speech or vibrations. In another embodiment, the head-mountable device 402 could be unlocked by a specific nasal vocalization.

For example, a user could unlock some or all of the functions of the head-mountable device 402 upon providing an unlocking nasal vocalization. The unlocking nasal vocalization could involve a cadence, pitch, or other characteristic of nasal vocalization specific to the user of the head-mountable device 402. A similar locking nasal vocalization could be used to lock the head-mountable device 402.

Nasal vocalizations could also include a sequence of notes, tones, and/or a part of a song, etc. For example, the user of the head-mountable device 402 could hum a tune so as to unlock the user interface of the head-mountable device 402.

4. Example Methods

Figure 5:
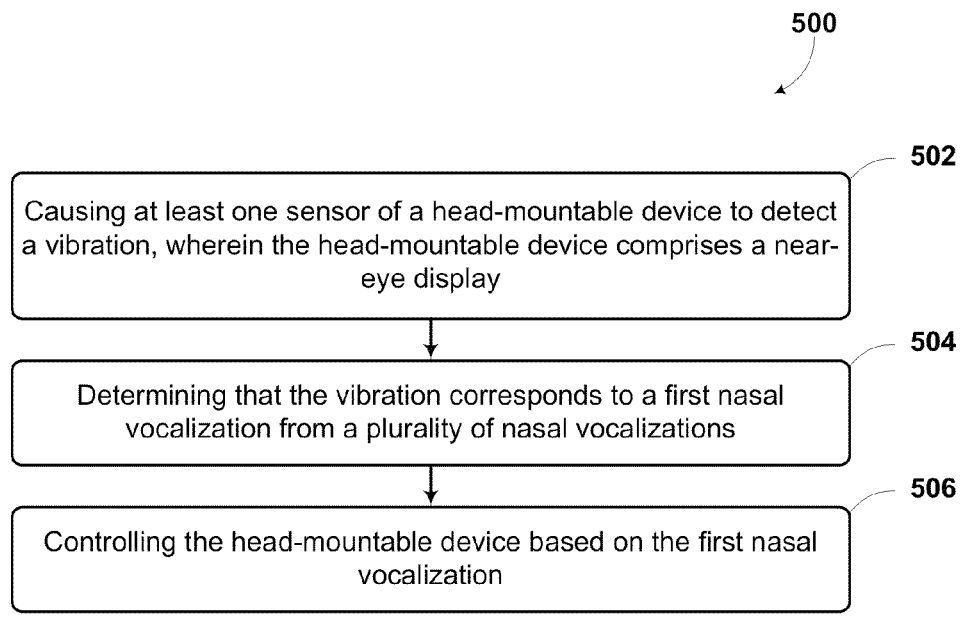
FIG. 5 is a method, according to an example embodiment.

A method 500 is provided for causing at least one sensor of a head-mounted device to detect a vibration, determining that the vibration corresponds to a first nasal vocalization from a plurality of nasal vocalizations, and controlling the head-mountable device based on the first nasal vocalization. The method could be performed using any of the apparatus shown in FIGS. 1A-4 and described above, however, other configurations could be used. FIG. 5 illustrates the steps in an example method, however, it is understood that in other embodiments, the steps may appear in different order and steps could be added or subtracted.

Step 502 includes causing at least one sensor of a head-mountable device to detect a vibration. The head-mountable device could include a near-eye display. The at least one sensor could be an accelerometer. The accelerometer could be operable to sense vibrations from a user of the head-mountable device. For example, the user may make nasal vocalization sounds and the accelerometer could be operable to transduce the sounds into electrical signals.

Step 504 includes determining that the vibration corresponds to a first nasal vocalization from a plurality of nasal vocalizations. The determination could be performed in a number of different manners. For instance, the vibration could be compared to the plurality of nasal vocalization using a speech-recognition system and associated speech-recognition algorithms. Such speech-recognition algorithms may include one or more of: a hidden Markov model, a dynamic time warping method, and neural networks. The speech-recognition algorithms could use a database or datastore of speech audio files and/or text transcriptions in determining that the vibration corresponds to a first nasal vocalization. The speech-recognition system could additionally or alternatively include a machine-learning algorithm. Other speech-recognition systems and/or other ways of determining a first nasal vocalization are possible.

In some embodiments, the determination could be made in full or in part by the head-mountable device. In other embodiments, the determination could be made in full or in part by another computer system, such as a server network.

Step 506 includes controlling the head-mountable device based on the first nasal vocalization. The controlling of the head-mountable device could be performed by a computer system, such as computer system 312 as described in reference to FIG. 3. The controlling of the head-mountable device could additionally or alternatively be performed by another computer system, such as a server network.

In some embodiments, a user interface of the head-mountable device could present an action to a user of the HMD. For example, a near-eye display of the head-mountable device could be configured to display a representation of an action for a user of the head-mountable device. In other examples, a representation of the action need not be displayed. Upon determining the first nasal vocalization is an affirmative vocalization, the head-mountable device could be controlled to carry out the action. Upon determining the first nasal vocalization is a negative vocalization, the head-mountable device could be controlled to dismiss the action or carry out a different action. Actions could relate to, but are not limited to: an event, a location, a person, an advertisement, a product, or a service. Other actions and other examples of controlling the head-mountable device based on the first nasal vocalization are possible.

Example methods, such as method 500 of FIG. 5, may be carried out in whole or in part by the device and its subsystems. Accordingly, example methods could be described by way of example herein as being implemented by the device. However, it should be understood that an example method may be implemented in whole or in part by other computing devices. For example, an example method may be implemented in whole or in part by a server system, which receives data from the device. Other examples of computing devices or combinations of computing devices that can implement an example method are possible.

Those skilled in the art will understand that there are other similar methods that could describe causing at least one sensor of a head-mountable device to detect a vibration, determining that the vibration corresponds to a first nasal vocalization from a plurality of nasal vocalizations, and controlling the head-mountable device based on the first nasal vocalization. Those similar methods are implicitly contemplated herein.

Figure 6:
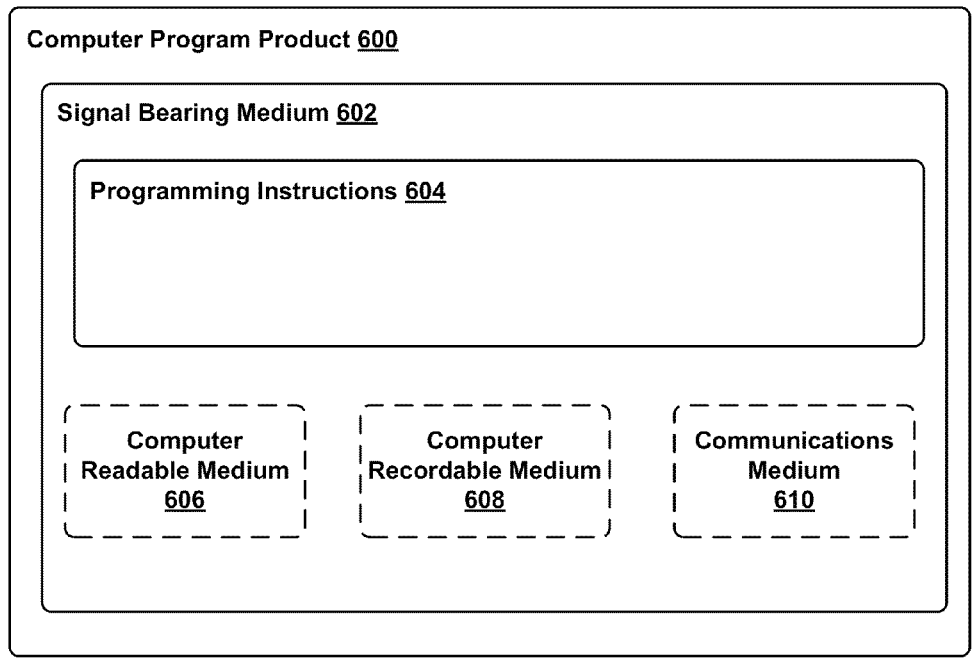
FIG. 6 is a schematic diagram of a computer program product, according to an example embodiment.

In some embodiments, the disclosed methods may be implemented as computer program instructions encoded on a non-transitory computer-readable storage media in a machine-readable format, or on other non-transitory media or articles of manufacture. FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1-5. In some examples, the signal bearing medium 602 may encompass a computer-readable medium 606, such as, but not limited to, a hard disk drive, a Compact Disc (CD), a Digital Video Disk (DVD), a digital tape, memory, etc. In some implementations, the signal bearing medium 602 may encompass a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the signal bearing medium 602 may be conveyed by a wireless form of the communications medium 610.

The one or more programming instructions 604 may be, for example, computer executable and/or logic implemented instructions. In some examples, a computing device such as the computer system 312 of FIG. 3 may be configured to provide various operations, functions, or actions in response to the programming instructions 604 conveyed to the computer system 312 by one or more of the computer readable medium 606, the computer recordable medium 608, and/or the communications medium 610.

The non-transitory computer readable medium could also be distributed among multiple data storage elements, which could be remotely located from each other. The computing device that executes some or all of the stored instructions could be a device, such as the head-mountable device 300 shown and described in reference to FIG. 3. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
    causing at least one sensor of a head-mountable device to detect a vibration, wherein the head-mountable device comprises a near-eye display and wherein the at least one sensor is configured to sense vibrations;
    determining, using a speech-recognition system, that the vibration corresponds to a first matched vocalization from a plurality of nasal vocalizations; and
    controlling the head-mountable device based on the first matched vocalization.

2. The method of claim 1, wherein the plurality of nasal vocalizations comprises at least an affirmative vocalization and a negative vocalization.

3. The method of claim 2, further comprising providing, using the near-eye display, a representation of an action.

4. The method of claim 3, wherein the first matched vocalization comprises the affirmative vocalization, wherein controlling the head-mountable device comprises proceeding with the action in response to the affirmative vocalization.

5. The method of claim 3, wherein the first matched vocalization comprises the negative vocalization, wherein controlling the head-mountable device comprises dismissing the action in response to the negative vocalization.

6. The method of claim 2, wherein the affirmative vocalization comprises an audible sound comprising at least one of: Mm-hmm, Uh-huh, and Um-hum.

7. The method of claim 2, wherein the negative vocalization comprises an audible sound comprising at least one of: Mm-mm, Uh-uh, Huh-uh, or Hum-um.

8. The method of claim 7, wherein the audible sound comprises a glottal stop.

9. A head-mountable device, comprising:
    a near-eye display;
    at least one sensor configured to detect a vibration;
    a speech-recognition system configured to determine that the vibration corresponds to a first matched vocalization from a plurality of nasal vocalizations; and
    a user interface, wherein the user interface is configured to control the head-mountable device based on the first matched vocalization.

10. The head-mountable device of claim 9, wherein the plurality of nasal vocalizations comprises at least an affirmative vocalization and a negative vocalization.

11. The head-mountable device of claim 9, wherein the at least one sensor comprises at least one accelerometer.

12. The head-mountable device of claim 9, wherein the at least one sensor comprises at least one microphone.

13. The head-mountable device of claim 9, wherein the speech-recognition system comprises a machine-learning algorithm.

14. The head-mountable device of claim 10, wherein the user interface is further configured to provide, using the near-eye display, a representation of an action.

15. The head-mountable device of claim 14, wherein the first matched vocalization comprises the affirmative vocalization, wherein the head-mountable device is configured to proceed with the action in response to the affirmative vocalization.

16. The head-mountable device of claim 14, wherein the first matched vocalization comprises the negative vocalization, wherein the head-mountable device is configured to dismiss the action in response to the negative vocalization.

17. The head-mountable device of claim 10, wherein the affirmative vocalization comprises an audible sound comprising at least one of: Mm-hmm, Uh-huh, and Um-hum.

18. The head-mountable device of claim 10, wherein the negative vocalization comprises an audible sound comprising at least one of: Mm-mm, Uh-uh, Huh-uh, or Hum-um.

19. The head-mountable device of claim 18, wherein the audible sound comprises a glottal stop.

20. The head-mountable device of claim 9 further comprising at least one nose pad, wherein the at least one nose pad comprises the at least one sensor.

21. The head-mountable device of claim 20 wherein the at least one sensor is configured to detect the vibration from a user's nasal cavity.

22. A non-transitory computer readable medium having stored therein instructions executable by a computer system to cause the computer system to perform functions, the functions comprising:
    causing at least one sensor of a head-mountable device to detect a vibration, wherein the head-mountable device comprises a near-eye display and wherein the at least one sensor is configured to sense vibrations;
    determining, using a speech-recognition system, that the vibration corresponds to a first matched vocalization from a plurality of nasal vocalizations; and
    providing a control instruction to the head-mountable device based on the first matched vocalization.

23. The non-transitory computer readable medium of claim 22, wherein the plurality of nasal vocalizations comprises at least an affirmative vocalization and a negative vocalization.

24. The non-transitory computer readable medium of claim 23, further comprising providing, using the near-eye display, a representation of an action.

25. The non-transitory computer readable medium of claim 24, wherein the first matched vocalization comprises the affirmative vocalization, wherein the control instruction comprises proceeding with the action in response to the affirmative vocalization.

26. The non-transitory computer readable medium of claim 24, wherein the first matched vocalization comprises the negative vocalization, wherein the control instruction comprises dismissing the action in response to the negative vocalization.

27. The non-transitory computer readable medium of claim 23, wherein the affirmative vocalization comprises an audible sound comprising at least one of: Mm-hmm, Uh-huh, and Um-hum.

28. The non-transitory computer readable medium of claim 23, wherein the negative vocalization comprises an audible sound comprising at least one of: Mm-mm, Uh-uh, Huh-uh, or Hum-um.

29. The non-transitory computer readable medium of claim 28, wherein the audible sound comprises a glottal stop.

* * * * *